United States Patent Office 2,884,439
Patented Apr. 28, 1959

2,884,439

RECOVERY OF METHOXY VALUES FROM NaB(OCH₃)₄ AND NaOCH₃

Lawrence J. Edwards, Zelienople, Pa., assignor to Callery Chemical Company, Pittsburgh, Pa., a corporation of Pennsylvania No Drawing. Application October 31, 1955
Serial No. 544,047

9 Claims. (Cl. 260—462)

This invention relates to the recovery of methoxy values from sodium tetramethoxyborate and sodium methoxide. More particularly it relates to a method of recovering methoxy values from sodium tetramethoxyborate and related residues by conversion to trimethyl borate.

Two methods for the preparation of sodium borohydride have recently been developed. In one of these, sodium hydride is reacted with trimethyl borate in the presence of tetrahydrofuran which method results in the formation of sodium tetramethoxyborate as a by-product. In the other method, sodium hydride and trimethyl borate are reacted in mineral oil to form sodium methoxide as a by-product. Both these methods produce high yields of sodium borohydride but the by-products must be discarded. In order to make these methods more attractive economically, the methoxy values contained in the by-products must be recovered in the form of trimethyl borate which in each case can be recycled for reaction with more sodium hydride.

One object of this invention is to provide a new and improved method for converting the methoxy values contained in sodium tetramethoxyborate and sodium methoxide into trimethyl borate.

Another object is to provide a simple and economical method for recovering the methoxy values contained in sodium tetramethoxyborate and related residues by reaction with chlorodimethoxyborane or boron trichloride to form trimethyl borate.

Other objects will appear from time to time throughout the following specification and appended claims.

This new and improved method for recovering methoxy values contained in the by-products of processes used to manufacture sodium borohydride will be more fully described hereinafter and the novelty thereof will be particularly pointed out and distinctly claimed.

This invention is based upon the discovery that when sodium tetramethoxyborate or sodium methoxide are reacted with chlorodimethoxyborane or boron trichloride in a suitable inert reaction medium, sodium chloride precipitates and the methoxy values are recovered as trimethyl borate. These reactions may be illustrated as follows:

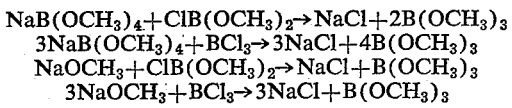

Since sodium tetramethoxyborate and sodium methoxide are both solids, it is preferable to dissolve or disperse them in a liquid medium before adding the chlorodimethoxyborane or boron trichloride. Tetrahydrofuran and any of the lower polyethylene glycol ethers having the general formula $RO(C_2H_4O)_nR$ where R is a lower alkyl radical and $n$ is an integer from 1 to 4, such as diethylene glycol dimethyl ether are satisfactory for this purpose. The reaction is rapid and the sodium chloride begins to precipitate immediately. The trimethyl borate solution can then be decanted or separated by filtration. If the pure trimethyl borate is desired, it can be readily obtained by distillation.

In one experiment, a solution of sodium tetramethoxyborate in diethylene glycol dimethyl ether was reacted with an equimolar quantity of chlorodimethoxyborane at room temperature. A white precipitate formed immediately which was identified as sodium chloride by X-ray and chemical analysis. The sodium chloride was removed by filtration leaving a clear solution of trimethyl borate in diethylene glycol dimethyl ether.

In another experiment, solid sodium methoxide was dispersed in tetrahydrofuran and an equimolar quantity of chlorodimethoxyborane was added. Sodium chloride precipitated as a white solid leaving a clear solution of trimethyl borate in tetrahydrofuran which was readily decanted.

Other experiments established the fact that a similar reaction takes place when either sodium tetramethoxyborate or sodium methoxide are reacted with boron trichloride in tetrahydrofuran or a polyethylene glycol ether such as di-, tri- or tetraethylene glycol dimethyl ether. The molar ratios of the reactants used is not critical. In each case enough boron trichloride or chlorodimethoxyborane is added to completely precipitate the sodium chloride formed. The reaction medium used is preferably one in which sodium chloride is insoluble and one which is inert to trimethyl borate. Thus, non-aqueous reagents are used to prevent hydrolysis of the trimethyl borate and to facilitate the removal of the sodium chloride formed. $NaB(OCH_3)_4$ and $NaOCH_3$ have also been found to react in a similar manner with $BCl_3$ or $BCl(OCH_3)_2$ in other inert liquids such as mineral oil.

In accordance with the patent statutes, I have described some specific embodiments of this invention and the best mode contemplated for practicing the same. However, it should be understood that within the scope of the appended claims, this invention may be practiced otherwise than as specifically described.

What I desire to claim and secure by Letters Patent of the United States is:

1. A method of recovering the methoxy values contained in a member of the group consisting of sodium tetramethoxyborate and sodium methoxide which comprises reacting one of said compounds with a compound selected from the class consisting of chlorodimethoxyborane and boron trichloride in an inert liquid reaction medium to form sodium chloride and recovering the methoxy values as trimethyl borate.

2. A method according to claim 1, said inert liquid reaction medium being one in which the by-product sodium chloride is substantially insoluble.

3. A method according to claim 1 in which the reaction medium is mineral oil.

4. A method according to claim 1 in which the reaction medium is a compound selected from the class consisting of tetrahydrofuran and polyethylene glycol ethers having the general formula $RO(C_2H_4O)_nR$ where R is a lower alkyl radical and $n$ is an integer from 1 to 4.

5. A method according to claim 4 in which the reaction medium is diethylene glycol dimethyl ether.

6. A method of recovering the methoxy values contained in sodium tetramethoxyborate which comprises reacting the same with chlorodimethoxyborane in tetrahydrofuran, removing the sodium chloride which precipitates and recovering the trimethyl borate liberated.

7. A method of recovering the methoxy values contained in sodium tetramethoxyborate which comprises reacting the same with boron trichloride in diethylene glycol dimethyl ether, removing the sodium chloride which precipitates and recovering the trimethyl borate liberated.

8. A method of recovering the methoxy values contained in sodium methoxide which comprises reacting the same with chlorodimethoxyborane in tetrahydrofuran, removing the sodium chloride which precipitates and recovering the trimethyl borate liberated.

9. A method of recovering the methoxy values contained in sodium methoxide which comprises reacting the same with boron trichloride in diethylene glycol dimethyl ether, removing the sodium chloride which precipitates and recovering the trimethyl borate liberated.

References Cited in the file of this patent

Michaelis: Berichte, vol. 27, page 253 (1894).
Wiberg et al.: Z. Anorganische und Allgemeine Chemie 202, pp. 1–21 (1931).